O. J. HOLMES.
FILM AND FILM SPROCKET.
APPLICATION FILED MAY 27, 1918.

1,299,469.

Patented Apr. 8, 1919.

Witness:
John Enders

Inventor:
Oscar J. Holmes,
by
Robert Burns,
Atty.

UNITED STATES PATENT OFFICE.

OSCAR J. HOLMES, OF CHICAGO, ILLINOIS.

FILM AND FILM-SPROCKET.

1,299,469.

Specification of Letters Patent.

Patented Apr. 8, 1919.

Application filed May 27, 1918. Serial No. 236,670.

*To all whom it may concern:*

Be it known that I, OSCAR J. HOLMES, a citizen of the United States of America, and a resident of Chicago, in the county of Cook, State of Illinois, have invented certain new and useful Improvements in Films and Film-Sprockets, of which the following is a specification.

This invention relates to the picture film and the feeding mechanism for the same, of a motion picture machine, and has for its object:

To provide a structural arrangement of the sprocket orifices of a motion picture film, and a complementary arrangement of the sprocket teeth of the film supply, and film feeding sprocket drums, by means of which the surreptitious or unintentional use of an ordinary inflammable picture film in a successful manner is prevented by a transverse tearing of said film in the initial movement of the same through the present structure. At the same time the present formation of the film does not interfere with the use of the film in a motion picture feeding mechanism of a standard formation, all as will hereinafter more fully appear.

In the accompanying drawing:—

Like reference numerals indicate like parts in the different views.

Figure 1:
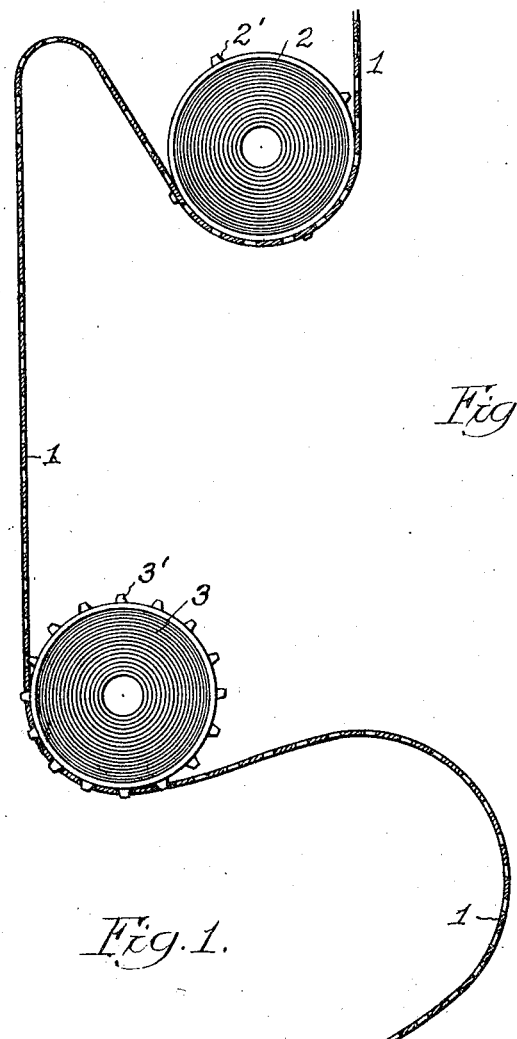
Figure 1, is a detail side elevation of the picture film and the usual sprocket drums by which it is fed past the light aperture of a motion picture machine.
Figure 3:
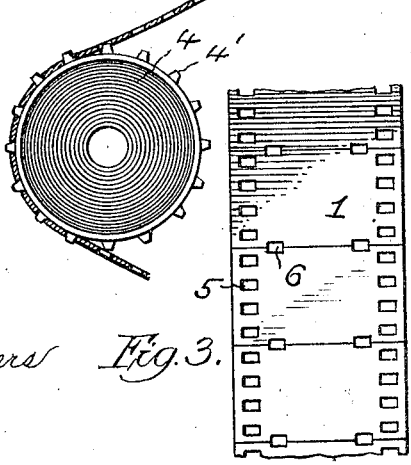
Fig. 3 is an elevation of a modified form of the present picture film.
Figure 2:
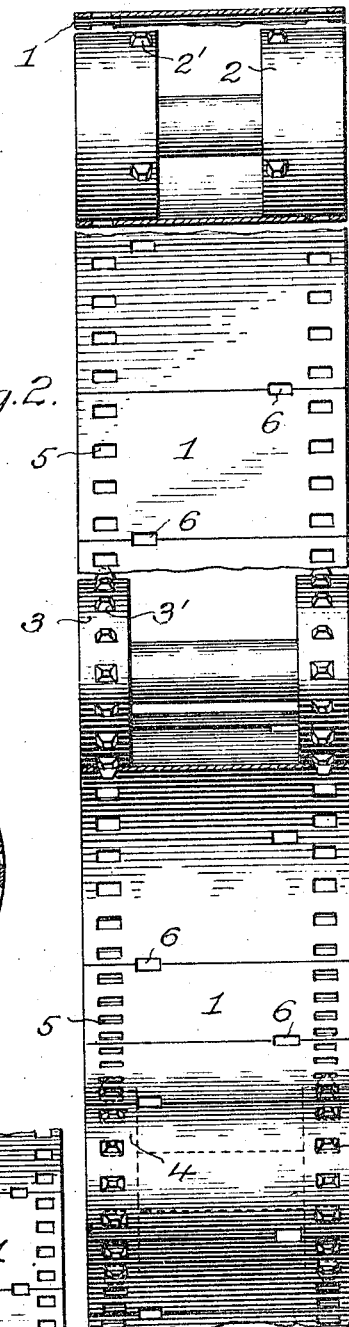
Fig. 2 is an end elevation of the same with parts removed and in section.

Referring to the drawing, 1 designates the motion picture film or web, 2 designates the film supply sprocket drum by which the film is drawn from a reel or magazine and fed in a continuous manner to the associated film feeding means, 3 designates the film feeding sprocket drum of the usual intermittent film feeding type, and 4 designates the film take-up sprocket drums of a motion picture machine. The said drums 2, 3 and 4 are arranged in any usual and suitable manner in relation to each other adapted for simultaneous operation from a common driving source, either manual or power driven.

In the present improvement, 5 designate outer rows of sprocket orifices formed in the respective marginal portions of the picture film or web 1, and preferably having the standard arrangement as to the spacing of the orifices of each row and as to the distance separating the respective rows. The sprocket orifices 5 are adapted for operative engagement with two sets of sprocket teeth 3' and 4' on the aforesaid film feeding and film take-up drums 3 and 4, and said sets of sprocket teeth 3' 4' will preferably have a standard spacing and separation corresponding to that of the sprocket orifices 5 above described.

6 designates inner rows of sprocket orifices formed in the picture film or web 1 and in the spaces between the series of pictures on said film. Said orifices 6 are a distance inside the above described outer series of orifices 5, and in the preferred arrangement the orifices of one row has a staggered or alternated relation to the orifices of the companion row, in order that a minimum number of the sprocket orifices may occur in transverse relation, thus avoiding an undue weakening of the film. Said sprocket orifices 6 are adapted for operative engagement with the sprocket teeth 2' of the aforesaid film supply drum 2, and will have circumferential spacing corresponding to the spacing of the orifices 6 aforesaid.

In actual use, the sprocket teeth 3' 4' of the drums 3, 4, are individual to the outer rows of sprocket orifices 5 of the picture film 1 and are adapted to effect the intermittent feed of said film past the aperture plate of the machine and a subsequent take-up of the film, as usual in motion picture machines of the intermittent film feeding type. The sprocket teeth 2' of the film supply drum 2 are individual to the inner rows of sprocket orifices 6 of the picture film 1, and are adapted to draw the film from its reel or magazine and feed said film in a continuous manner and in the form of a free loop to the associated intermittent film feeding means of a motion picture machine.

With the present construction, when the use of an improper motion picture film of the standard formation is attempted, no operative engagement of the film supply sprocket drum 2 with said film can take place, and accordingly the operation of drawing the film from its reel or magazine and the continuous feeding of the film in the form of a loop to the motion picture mechanism will not take place. In consequence, such operative stress will be imposed on the intermittent film feeding drum 3, which owing to its rapid intermittent rotation is sure to effect an immediate tearing of the picture film.

Having thus fully described my said invention what I claim as new and desire to secure by Letters Patent, is:—

1. In a motion picture mechanism, the combination of a motion picture film formed with rows of outer marginal sprocket orifices and with a row of inner sprocket orifices arranged between pictures of the series on the film, an intermittent film feeding drum having sprocket teeth corresponding with and adapted for operative engagement with said outer rows of orifices of the film, and a film supply drum having sprocket teeth corresponding with and adapted for operative engagement with the inner row of orifices of the film, substantially as set forth.

2. In a motion picture mechanism, the combination of a motion picture film formed with rows of outer marginal sprocket orifices and with a plurality of rows of inner sprocket orifices arranged between pictures of the series on the film, an intermittent film feeding drum having sprocket teeth corresponding with and adapted for operative engagement with the outer rows of orifices of the film, and a film supply drum having sprocket teeth corresponding with and adapted for operative engagement with the inner rows of orifices of the film, substantially as set forth.

3. In a motion picture mechanism, the combination of a motion picture film formed with rows of outer marginal sprocket orifices and with a plurality of rows of inner sprocket orifices arranged in alternated relation to each other between pictures of the series on the film, an intermittent film feeding drum having sprocket teeth corresponding with and adapted for operative engagement with the outer rows of orifices of the film, and a film supply drum having sprocket teeth corresponding with and adapted for operative engagement with the inner rows of orifices of the film substantially as set forth.

Signed at Chicago, Illinois, this 22nd day of May, 1918.

OSCAR J. HOLMES.